INVENTOR
R. G. PIETY

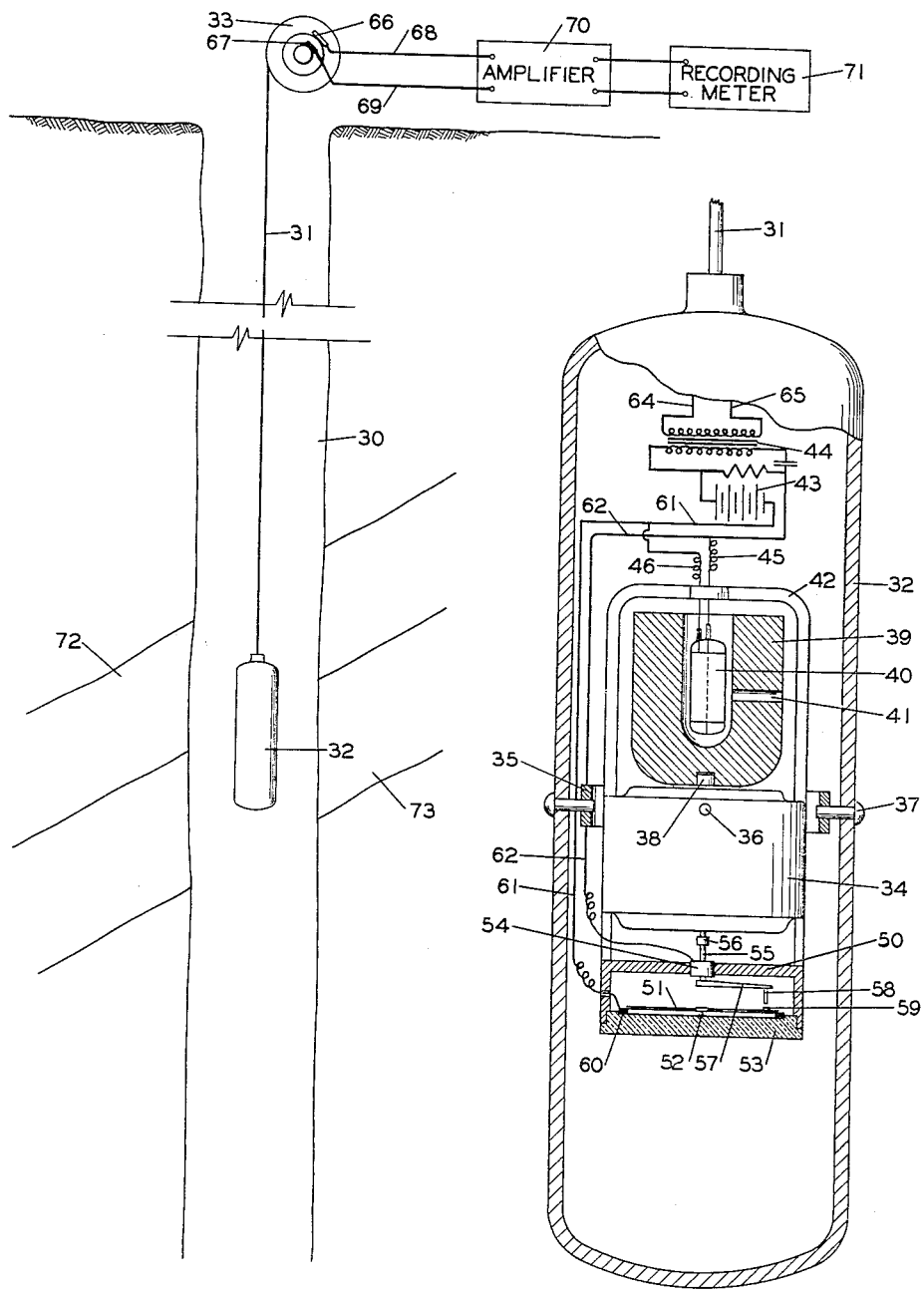

Patented Apr. 13, 1943

2,316,361

UNITED STATES PATENT OFFICE 2,316,361

METHOD AND APPARATUS FOR SURVEYING WELLS

Raymond G. Piety, Bartlesville, Okla., assignor to Phillips Petroleum Company, a corporation of Delaware Application March 17, 1941, Serial No. 383,818

16 Claims. (Cl. 250—83.6)

This invention relates to improvements in method and apparatus for determining the radioactivity in bore holes.

Radioactivity has been found to be associated with the various earth strata in varying amounts. The radioactivity of the earth's rocks is, for all practical purposes, constant. Of the sedimentary rocks, shales are the most radioactive, the black or dark colored shales being far more radioactive than any of the other rocks. Sandstones and limestones are the least radioactive, the sandstones being generally less radioactive than the limestone. Although the concentrations of radioactive materials in the earth's formations are generally very small, the radioactivity of the rocks is sufficient to furnish a means of correlating the various strata. It is known at present that the Geiger counter, an instrument well known to the physicist, may be used to detect the gamma rays from radioactive materials associated with the earth's strata and well surveying instruments employing the Geiger counter have been devised. Such an instrument is shown and described in the co-pending application of R. G. Piety and H. H. Kaveler, Serial No. 329,810, filed April 15, 1940.

In logging a well for radioactivity with an instrument employing a Geiger counter, usual practice is to enclose the Geiger counter in a suitable housing which excludes well fluids but allows gamma rays to pass through. Radiations from all directions strike and activate the Geiger counter although most of the radiations affecting the instrument are from the nearby surrounding formation. It is difficult to determine with this instrument the exact depth at which the instrument passes from one geological strata to another exhibiting a different amount of radioactivity. If a natural geological marker, or a marker of the type disclosed in the above mentioned application of Kaveler and Piety, is used as a reference point from which measurements are made, it is essential that the marker be accurately located to insure accuracy of the measurements. The present invention provides apparatus for accurately determining the position of such a marker.

An object of this invention is to provide apparatus of increased resolving power for determining variations in radioactivity of the earth formations pierced by a well bore.

Another object of this invention is to provide a method of and apparatus for determining the direction of inclination of earth strata pierced by a well bore.

Still another object of this invention is to provide apparatus for determining the angular distribution of radioactive materials about a well bore.

Often a geologist is interested in the direction of inclination, in the angle of inclination or the dip, and in the direction of intersection with a horizontal plane, or the strike, of the various strata pierced by a well bore. Heretofore it has been possible to determine the dip and strike of any particular subsurface stratum only by drilling three holes into the stratum. The present invention provides a method and apparatus for determining the strike and approximating the dip of a stratum pierced by a single bore hole. This method is based on the difference in the radioactivity of adjacent strata.

The angular distribution of radioactive materials in the formations surrounding a bore hole may be variable due to either natural variations in radioactivity or to a radioactive marker previously placed in the formation as disclosed in the aforesaid patent application of Kaveler and Piety. The angular distribution is determined in the present invention by novel apparatus which is directional. This apparatus enables an operator to determine the exact position of a radioactive marker or formation of interest and to determine the azimuth of such a marker. The operator may thus obtain a reference direction in the well bore for reference in locating other equipment.

The invention, its objects and advantages, will be more clearly understood from the following detailed description and the accompanying drawings.

Figure 3 is a diagrammatic view of a modification of the apparatus of the present invention.

Figure 4 is a diagrammatic view showing the apparatus of Figure 3 in operating position in a bore hole.

Figures 1, 2:
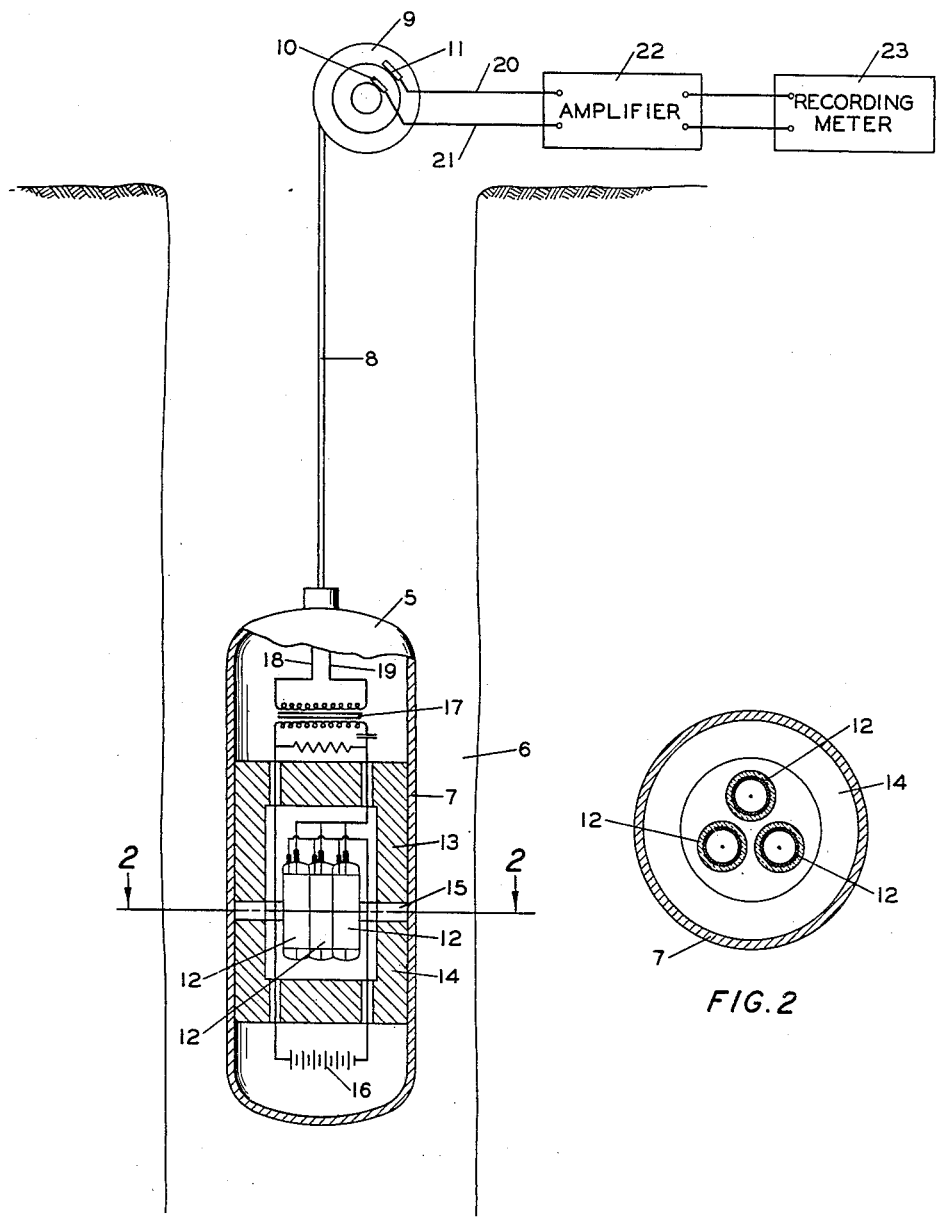
Figure 1 is a diagrammatic view of one embodiment of the present invention.
Figure 2 is a cross-section taken along the plane 2—2 of Figure 1.

With reference to Figures 1 and 2 of the drawings, a well surveying instrument, designated generally by the numeral 5, is shown in operating position in a bore hole 6. The instrument housing 7 of steel or other suitable metal excludes the well fluid but allows passage of gamma rays into its interior. The surveying instrument is suspended in the bore hole by a cable 8 containing a pair of electrical conductors. The cable is supported at the surface of the earth by a reel 9 which serves to position the surveying instrument in the bore hole. Contact between the electrical conductors in cable 8 and electrical equipment at the surface of the earth is established through slip ring and brush connections 10 and 11 on the reel. Inside the housing 7 of the surveying instrument 5 is a cluster of three Geiger counters 12. Lead shields 13 and 14 are arranged to shield the counters from radiations coming from any direction other than at right angles to the axis of the surveying instrument. The arrangement of the Geiger counters within the housing and lead shields will be apparent from Figure 2. Radiations from the surrounding formation passing through the housing 7 may enter the chamber defined by the lead shields 13 and 14 only by passing through the opening 15 between the shields.

Geiger counters are well known; it is sufficient for the purpose of this invention to state that they allow a pulse of current to flow through the counter circuit when activated by a gamma ray. The efficiency of the Geiger counter is low, on the order of 5 to 10 per cent, therefore many of the gamma rays pass through the Geiger counter without activating it. To make the surveying instrument more sensitive, the Geiger counters 12 are connected in parallel in the counter circuit and supplied with current from a common source. It is possible to increase the sensitivity of the surveying instruments nearly in direct proportion to the number of counters used in parallel.

Power is supplied to the Geiger counters from a source 16 of high voltage, direct current. Current from the source 16 flowing through the counter circuit and through any of the Geiger counters passes through the primary winding of the transformer 17. Current generated in the secondary of the transformer 17 is transmitted to the surface of the earth by electrical conductors 18 and 19 which pass through the cable 8. This current is picked up at the reel 9 by the slip ring and brush connections 10 and 11, and transmitted by electrical conductors 20 and 21, to the amplifier 22 and the recording meter 23. Thus the recording meter 23 records the pulses of current flowing through the counter circuit due to activation of the Geiger counters by gamma rays. The apparatus, which receives gamma rays only from the formation directly opposite the Geiger counters, gives improved accuracy in locating markers and a sharp delineation of natural radioactive variations.

The modification of the invention shown in Figure 3 of the drawings provides means for the determination of the angular variations in radioactivity and of the directions of such variations. The surveying instrument in this instance is suspended in a bore hole 30 by a cable 31 attached to the housing 32 of the instrument. The cable is carried by a reel 33 at the surface of the earth by which the surveying instrument may be extended or retracted along the bore hole. Within the housing 32, a prime mover 34 is mounted on a gimbal so that it will remain plumb or level when the housing is tipped. The gimbal consists of a ring 35 in which the prime mover, pivoted on pins 36, can turn on an axis through the diameter of the ring while the ring 35 is pivoted on the pins 37 so that it is free to turn on an axis at right angles to that of the prime mover. The prime mover 34 may be a clockwork motor or an electrical motor of the selsyn or asynchronous type. Carried by and connected to the shaft 38 of the prime mover is a lead shield 39 which is revolved slowly by the prime mover. Positioned within the hollow interior of the shield 39 is a Geiger counter 40. Radiations from radioactive substances in the formations surrounding the bore hole may reach the Geiger counter by passing through the opening 41 in the shield. The Geiger counter is effectively shielded from the action of gamma rays from portions of the formation other than that directly opposite the opening 41. A bail 42, attached to the exterior of the prime mover 34, extends up over the shield 39 and supports the Geiger counter in its proper position within the rotating housing. Power is supplied to the Geiger counter from a source 43 of high voltage direct current. The counter circuit comprises the current source 43, the primary winding of a transformer 44, and the Geiger counter 40. The insulated wires 45 and 46, by which the power from the source 43 is transmitted to the Geiger counter, are flexible to permit freedom of movement of the Geiger counter and the supporting bail 42.

Attached to the prime mover 34 and extending below it is the portion 50 of the compass housing which serves to support the compass and shield the compass needle from electrical interference. The magnetic compass needle 51 is pivoted on a bearing 52 which is mounted on the nonconducting lower portion 53 of the compass housing. An insulated bearing 54 is mounted in the upper portion of the compass housing directly above the bearing 52. The shaft 55 extends through the insulated bearing 54 and is driven by the prime mover 34 to which it is connected by the coupling member 56. Carried by and attached to the shaft 55 is an arm 57 having a spark point 58 extending downwardly therefrom. On one end of the compass needle, preferably the north-seeking end, is a corresponding spark point 59. A metallic ring 60 on the insulated portion 53 of the compass housing surrounds the compass needle at a fixed distance from its ends. The metallic ring is connected to one pole of the current source 43 by the conductor 61. The conductor 62 from the opposite pole of the current source is connected to the arm 57 through the bearing 54. When the spark point 58 on the rotor is directly above the corresponding point 59 on the compass needle, a spark is formed between the points 58 and 59 and a spark is formed also between the compass needle 51 and the metallic ring 60. Whenever this sparking occurs, a pulse of current from the source 43 flows through the primary winding of the transformer 44. For the magnetic compass herein described, an equivalent, the gyro compass may be substituted wherever desirable, or because of difficulty experienced in use of a magnetic compass under the particular conditions of the survey.

Pulses of current flowing through the primary winding of the transformer 44, due to activation of the Geiger counter by gamma rays or to sparking in the compass, generate corresponding pulses of current in the secondary winding of the transformer. These are transmitted to the surface of the earth by the electrical conductors 64 and 65 which pass through the cable 31. Slip ring and brush connections 66 and 67 pick up the current at the cable reel 33 from which it is transmitted by conductors 68 and 69 to an amplifier 70 and recording meter 71. The recording meter records the pulses of current due to the Geiger counter and the compass. The pulses of current due to the Geiger counter are a measure of the radioactivity of that portion of the formation directly opposite the opening 41 in the lead shield 39. The pulses of current due to the compass, which are of greater intensity, occur only when the rotor 57 passes directly over the north-seeking end of the compass needle 50. The chart of the recording meter may be driven in any suitable manner, such as by clockwork, a selsyn motor, or an asynchronous motor, that will allow correlation of the data obtained in the bore hole. By interpolation on the chart between pulses recorded each time sparking occurs in the compass, it is possible for the operator to determine the directions from which radiations are received by the Geiger counter as determined by the revolving shield 39. This is especially useful in determining the dip and strike of subsurface strata.

For example, in Figure 4, the numerals 72 and 73 refer to strata inclined with respect to the axis of the bore hole and having associated therewith different amounts of radioactivity. During a part of the revolution of the lead shield 39 emanations from radioactive materials in the stratum 73 enter the opening 41 and activate the Geiger counter 40. During another part of the revolution emanations from the radioactive materials in the stratum 72 enter the opening 41. By correlation of the directional variations in radioactivity and its angular distribution about the Geiger counter the geologist may readily determine the strike of the strata 72 and 73. A series of these determinations at known positions along the bore hole may be utilized to approximate the dip of strata when the bore hole is uniform and of known diameter. The same instrument may be used in an analogous manner to determine the inclination of the bore hole 30 in localities where the dip of the subsurface strata 72 and 73 is known or in the same bore hole after the dip of the strata has been determined. When used to determine the inclination of the bore hole, the gimbals are rendered inoperative so that the axis of the Geiger counter and shield coincides with the axis of the housing 32. This instrument may also be used in conjunction with radioactive markers to orient equipment in a well bore, e. g., the direction from which a core is taken from the side of the bore hole may be determined. By depositing a small amount of radioactive material at the time a side wall core is taken, the apparatus of Figure 3 may then be used to determine the position and direction from which the core was taken from the side wall.

It is not anticipated that every formation will possess sharply defined boundaries and radioactive contrasts which will allow the orientation to be determined without uncertainty. In general it is true that there are several beds which are conformable so that several determinations may be averaged. The determination of the horizontal projection of the direction of maximum dip is of considerable help in interpreting cores taken and may be used in many cases to determine the actual orientation of the core when it was in place. In the event that there is a considerable variation in the permeability of the formations penetrated it is possible to force varying amounts of radioactive fluid into the formation prior to use of the surveying instrument to greatly increase the activity of the porous formation.

It is to be understood that various changes in size, shape, and relative position of the parts comprising the apparatus of my invention may be resorted to without departing from the spirit of the invention.

I claim:

1. The method of determining the distribution of radioactive materials in the earth surrounding a bore hole comprising placing in the bore hole a directional detector responsive to radioactive radiations, and observing the direction and response of said detector with respect to a reference point on a magnetic compass.

2. The method of determining the distribution of radioactive materials in the earth surrounding a bore hole comprising placing in the bore hole a detector responsive to radioactive radiations striking the detector from a given direction, varying the direction of response, and observing the variations in the response of the detector with variations in the direction.

3. The method of determining the distribution of radioactive materials in the earth surrounding a bore hole comprising placing a detector responsive to radioactive radiations in the bore hole, rotating the detector at a substantially constant speed, and observing the variations in the response of the detector during rotation.

4. The method of determining the distribution of radioactive materials in the earth surrounding a bore hole comprising placing a detector responsive to radioactive radiations in the bore hole, exposing the detector to radiations from a limited section of the surrounding earth at a point along the axis of the bore hole, successively exposing the detector to radiations from different sections of the earth surrounding the well bore at said point, observing the directions of the different sections and observing the variations in the response of the detector upon being exposed to said sections.

5. The method of determining the distribution of radioactive materials in the earth surrounding a bore hole comprising placing in the bore hole a directional detector responsive to radiations from radioactive materials, changing the position of said detector to receive radiations from different directions about the axis of the bore hole, and observing the variations in the response of said detector with changes in its position.

6. The method of determining the distribution of radioactive materials in the earth surrounding a bore hole comprising placing in the bore hole a detector responsive to radioactive radiations, shielding a portion of the detector from radiations entering the bore hole from the adjacent earth formations, determining the direction of the exposed portion of the detector, and observing the response of said detector.

7. The method of determining the distribution of radioactive materials in the earth surrounding a bore hole comprising placing a detector responsive to radioactive radiations in the bore hole, shielding the detector from radiations entering the bore hole from certain directions, varying said shielding to vary said directions, and observing variations in the response of said detector with variations in said directions.

8. In the method of surveying a bore hole by observation of the radioactivity associated with the earth surrounding the bore hole, the improvement which comprises placing a detector responsive to the direction and frequency of radioactive radiations in the bore hole and observing the response of said detector with variations in its direction and position in the bore hole.

9. The method of surveying a bore hole comprising suspending in the bore hole a detector responsive to radioactive radiations received by the detector from a given direction, and determining at successive points along the axis of the bore hole the variations in the response of the detector with variations in the direction of receipt of the radiations about the axis of the bore hole.

10. Apparatus for determining the relative radioactivity of earth formations surrounding a bore hole comprising a detector responsive to radioactive radiations from a given direction, means for suspending the detector in the bore hole, and means for indicating the direction from which the radioactive radiations are received by the detector.

11. Apparatus for determining the relative radioactivity of earth formations surrounding a bore hole comprising a detector responsive to radioactive radiations, means for supporting the detector in the bore hole, and means for limiting the portion of the earth to which the detector is exposed, and means for indicating the direction of said portion of the earth.

12. Apparatus for determining the relative radioactivity of earth formations surrounding a bore hole comprising a detector responsive to radioactive radiations, means for supporting the detector in the bore hole, and a directional shield for limiting the portion of the earth around the bore hole to which the detector is exposed, and means for indicating the direction of said portion of the earth.

13. Apparatus for determining the relative radioactivity of earth formations surrounding a bore hole comprising a detector responsive to radioactive radiations, means for supporting the detector in the bore hole, and a shield having an opening therein rotatable about an axis substantially parallel to the axis of the bore hole, said opening admitting radioactive radiations to the detector, and means for determining the position of the shield during rotation.

14. Apparatus for determining the relative radioactivity of earth formations surrounding a bore hole comprising a detector responsive to radioactive radiations, means for supporting the detector in the bore hole, and a directional shield associated with the detector, means for rotating the shield to vary its effective direction, and means for determining the effective direction of the shield during rotation.

15. Apparatus for determining the relative radioactivity of earth formations surrounding a bore hole comprising a detector responsive to radioactive radiations, means for supporting the detector in the bore hole, and a shield substantially impervious to radioactive radiations limiting the receipt of radioactive radiations by the detector to those entering from an angular segment of the bore hole substantially normal to the axis of the detector, means for changing the direction of the segment from which radiations are received relative to the detector, and means for indicating the direction of said segment relative to the detector.

16. Apparatus for determining the relative radioactivity of earth formations surrounding a bore hole comprising a detector responsive to radioactive radiations, means for supporting the detector in the bore hole, and a directional shield associated with the detector limiting the direction relative to the axis of the bore hole from which the radioactive radiations may be received by the detector to a direction substantially normal to the axis of the bore hole and means for determining the direction of the receipt of the radiations relative to a plane normal to the axis of the bore hole.

RAYMOND G. PIETY.